//

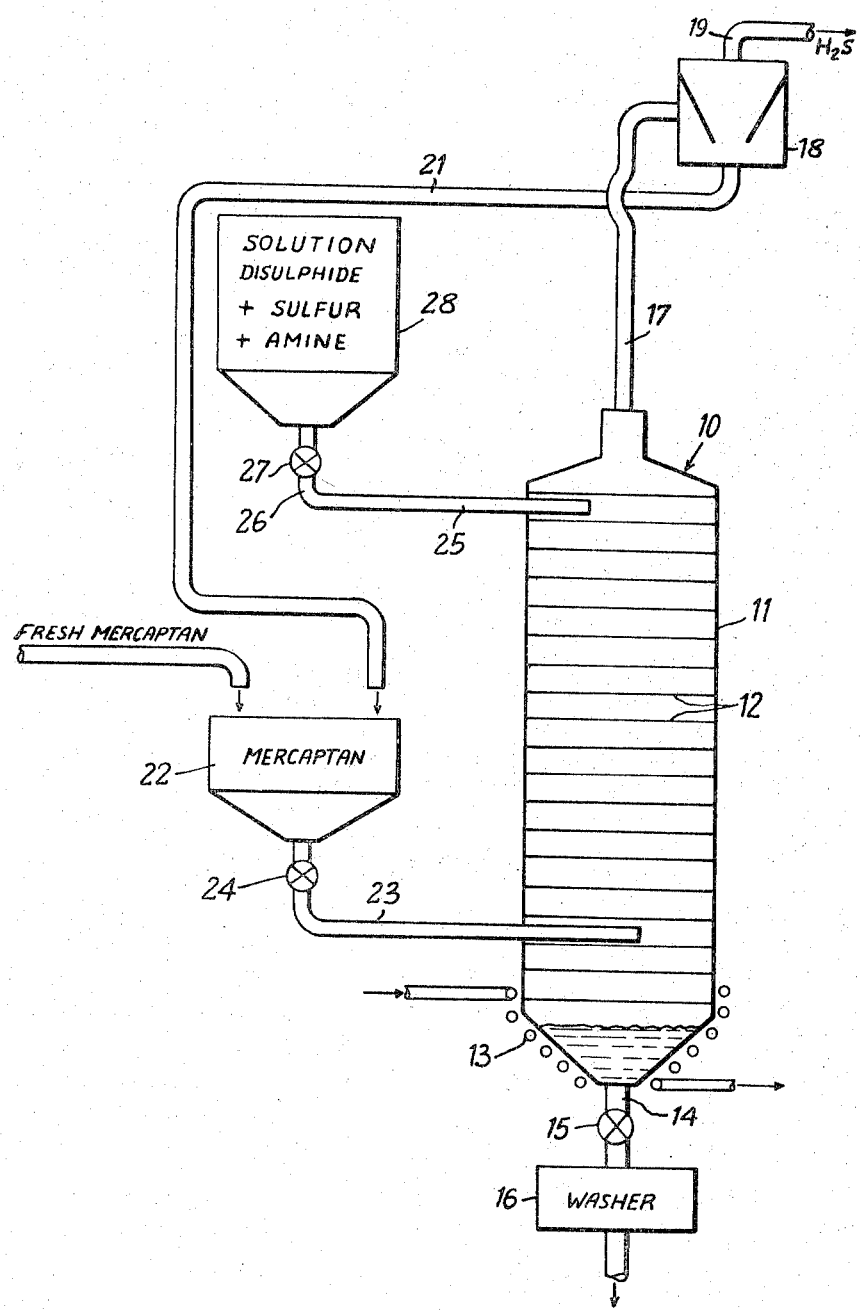

United States Patent Office 3,314,999
Patented Apr. 18, 1967

3,314,999
PROCESS FOR THE PREPARATION OF ORGANIC DISULPHIDES
Pierre Bapseres and Michel Biensan, Pau, France, assignors to Societe Nationale des Petroles d'Aquitaine, Paris, France, a corporation of France
Filed Nov. 15, 1963, Ser. No. 324,907
10 Claims. (Cl. 260—608)

This invention relates to a process for the preparation of organic disulphides and, more particularly, to a method for the production of disulphides by the reaction of elementary sulphur on mercaptans.

One of the processes used in the preparation of disulphides of alkyls, aryls, or arylalkyls consists in the sulphidation of the corresponding mercaptans by means of elementary sulphur. In this well-known process, the reaction is catalyzed by such substances as aliphatic amines. However, this method has many disadvantages which, until the present time, have made its industrial application of less than economic interest. This is because the action of the sulphur on the mercaptans, as performed in accordance with this prior art process, not only resulted in mixtures of disulphides and organic polysulphides, but also a large amount of the mercaptan which was introduced into the process was not transformed into the disulphide. For that reason, it has always been necessary to employ distillation to separate out the desired sulphide; at the same time, it has been necessary to separate the hydrogen sulphide formed from the remaining mercaptan by a process of distillation. Furthermore, the fact that solid elementary sulphur was used has meant that a discontinuous or "batch" process had to be used because of the difficulty of controlling the flow of powdered or solid sulphur. Also, when the volatile mercaptans were used, the previously-known process required the use of a high pressure to maintain the starting material in the liquid state. These and other difficulties experienced with the prior art methods have been obviated in a novel manner by the present invention.

It is, therefore, an outstanding object of the invention to provide a process for preparing organic disulphides in which it is possible to use a direct sulphidation reaction for converting mercaptans into disulphides by means of elementary sulphur without the aforesaid disadvantages.

Another object of this invention is the provision of a method of producing pure alkyl, aryl, or arylalkyl disulphides free from polysulphides without the need for distillation of the product of the reaction.

A further object of the present invention is the provision of a process for the preparation of disulphides by the reaction of elementary sulphur on mercaptans, which process can be carried out as a continuous process.

It is another object of the instant invention to provide a method for the production of disulphides from mercaptans in which the reaction can take place at atmospheric pressure even when volatile mercaptans are involved.

It is a further object of the invention to provide a process for the production of organic disulphides in which the yield is distinctly improved over prior art processes, the yield with respect to the mercaptan consumed being increased to the vicinity of 97% as compared with an 80% in previously-known processes.

With the foregoing and other objects in view, which will appear as the description proceeds, the invention resides in the combination and arrangement of steps hereinafter described and claimed, it being understood that changes in the precise embodiment of the invention herein disclosed may be made within the scope of what is claimed without departing from the spirit of the invention. The character of the invention, however, may be best understood by reference to the accompanying drawing in which the single figure shows a schematic view of apparatus for carrying out a process in accordance with the principles of the present invention.

Generally speaking, the present invention consists in causing a mercaptan to react with sulphur dissolved in an organic solvent of this non-metal. Thus, instead of coming into contact with solid sulphur, as in the prior art, the mercaptan is brought into the presence of a solution of sulphur. According to a preferred embodiment of the invention, an organic disulphide is used for dissolving the sulphur and, in the preferred embodiment, the disulphide used has the same radical as that of the mercaptan and, therefore, of the disulphide which it is desired to produce. Various catalysts may be used, but the process operates particularly well when the catalyst is an amine. This is because of the fact that the solubility of the sulphur in organic sulphide is considerably increased by the addition of small quantities of an amine in the disulphide, so that, in the preferred form of the invention, the amine serves the dual function of a catalyst and of a substance for increasing the solubility of the sulphur in the solution. For example, it has been found possible to dissolve 150 grams of sulphur in 100 grams of dimethyldisulphide at 20° C. and 250 grams of sulphur at 50° C., if the disulphide contains 1% of an amine, such as triethylamine. The preferred form of the invention, therefore, consists in causing a mercaptan to act with a concentrated solution of sulphur in a quantity of the same disulphide as is to be manufactured, this solution containing a small proportion of amine; for example, from 0.5 to 5% thereof. The reaction can take place at different temperatures but takes place particularly well in the range between 0° and the boiling point of the sulphide, but preferably between 50° C. and the said boiling point.

Referring to the drawing, it can be seen that the apparatus, indicated generally by the reference numeral 10, consists of a vertical reaction tower 11, having perforated plates 12, which tower may be a distillation column. The lower part of the tower is provided with a heating arrangement, such as a coil 13, permitting the regulation of the temperature within the tower. The tower is provided with a discharge conduit 14 having a valve 15 leading to a washer 16 from which the product is discharged after treatment.

The upper part of the tower is provided with a conduit 17 leading to a gas separator 18 from the upper portion of which extends a conduit 19 through which $H_2S$ is carried away from the apparatus. The bottom portion of the gas separator 18 is connected by a conduit 21 to a storage tank 22 adapted to store mercaptan until use. From the bottom portion of the tank 22 extends a conduit 23 having a control valve 24, the conduit 23 extending into the interior of the tower 11 in the lower portion thereof. A conduit 25 extends into the upper portion of the tower and has connected thereto a conduit 26 having a valve 27 which is attached to a storage tank 28 adapted to store a solution of elementary sulphur in liquid disulphide which contains the required amount of amine.

The quantity of solution of sulphur in the disulphide used per kilogram of mercaptan is preferably such that the weight of the dissolved sulphur corresponds to the amount required by the following equation:

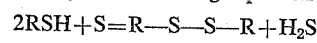
$$2RSH + S = R\text{—}S\text{—}S\text{—}R + H_2S$$

Nevertheless, in a continuous operation, the quantity of sulphur solution can vary, since it is possible for the quantity of reagents which are in excess of the theoretical amount to be easily re-cycled. The amine in the solution serves a double purpose; it serves to increase the solubility of the sulphur in the disulphide which serves as the reaction medium and it also serves to catalyse the action. The concentration of the amine can vary provided that its content in relation to the mercaptan is sufficient for the catalytic effect; for example, from .04 to 1%, according to the molecular weights of the mercaptan and of the amine. Generally speaking, for catalytic action, 0.04 to 1% suffices while, in order to operate properly as a solvent producing agent, about at least 0.5% should be used.

As a practical matter, a quantity of amine in an amount in the order of 0.5 to 5% is dissolved in the sulphide.

The present process can be used for the manufacture of disulphides from various mercaptans, such as, for example, methyl, ethyl, n-propyl, iso-propyl, n-butyl, iso-butyl, amyl, hexyl, and benzyl mercaptans. When these various mercaptans are used, the product is, respectively, the dimethyl, diethyl, dipropyl, diisopropyl, dibutyl, diisobutyl, diamyl, dihexyl, diphenyl, and dibenzyl disulphide. Among the amines which can be used for increasing the solubility of the sulphur in the disulphide, are the primary, secondary, and tertiary aliphatic amines, particularly those of the aforementioned alkyls and those of alkanolamines, especially the ethanolamines.

The operation of the process will be readily understood in view of the above description taken along with the description of the apparatus 10. Basically, this consists in causing the mercaptan which is to be sulphided and the solution of sulphur in the disulphide to flow in counter-current in a packed column or a plate-type column.

According to the setting of the valve 27, the disulphide solution flows from the tank 28 through the conduit 26 and along the conduit 25 on the way to the tower 11.

The liquid flows vertically downwardly through the tower 11 passing through the holes in plates 12. At the same time, the mercaptan leaves the tank 22, passes through the valve 24, and then enters the bottom of the tower 11 through the conduit 23. Because it is naturally volatile and because the tank is at a raised temperature, the mercaptan vaporizes and the fumes flow upwardly through the tower 11, coming into intimate contact with the solution flowing downwardly from the conduit 25.

The reaction takes place in accordance with the above described formula and the liquid disulphide continues to flow downwardly into the bottom of the tower 11. It passes downwardly through the conduit 14 and the valve 15 into the washer where it is subjected to a water treatment to remove the amine before being removed for consumption. The by-product of the reaction of the sulphur and the mercaptan is H₂S gas which flows upwardly through the tank and eventually flows through the conduit 17 into the gas separator 18.

The gas continued outwardly through the conduit 19 for disposal, while the small amount of mercaptan remaining in the gas is carried through the conduit 21 back to the storage tank 22 for recycling.

One of the important advantages of the invention is the possibility of working under heat at atmospheric pressure with volatile mercaptans, such as the methyl mercaptan which boils at 6°C. The process can, nevertheless, be carried out under pressure, if desired, especially under moderate pressures of 1 to 15 atmospheres. One effective method of procedure in connection with mercaptans having high boiling points consists in maintaining a vacuum in the reaction apparatus.

The operation of the invention is illustrated by the following non-limitative examples in which the expression DMDS stands for dimethyldisulphide, while ET₃N indicates triethylamine.

Example I

The process was carried out in an apparatus similar to the apparatus 10 shown in the drawings, wherein the tower had approximately fifteen of the baffles 12. The tower was supplied at the upper end with a solution of sulphur in dimethyldisulphide containing 170 parts of sulphur to 100 parts of DMDS. This solution contained 1% by weight of triethylamine. Gaseous methyl mercaptan was introduced at the bottom of the tower. When suitable rates of flow were established, there was obtained at the base of the tower dimethyldisulphide saturated with methyl mercaptan in the amount of about 20% by weight. At the top of the column, the H₂S contained about 10% by weight of CH₃SH. This corresponded to a loss of 3% of the CH₃SH introduced, this being due to the reversibility of the formation reaction of the disulphide. The principal reaction was carried out on the central baffles of the tower where the temperature reached about 60° C. At the base of the tower occurred the extraction of the polysulphide which had formed; this took place by the reaction of the polysulphides on the mercaptan resulting in the formation of dimethyldisulphide. The baffles at the upper end of the tower served to extract the methyl mercaptan in the gas by reaction with the solution of polysulphides. Under these conditions, the balance of the reaction, after operation for one hour, was as follows:

4,000 grams of products were introduced, this being in the form of 3,000 grams (62.5 moles) of CH₃SH and of 1,000 grams of the solution of polysulphides, the latter consisting of 369 grams of DMDS, 4 grams of ET₃N, and 627 grams of sulphur. 4,000 grams of products were obtained, of which there were 722 grams of gas consisting of 666 grams (19.6 moles) of H₂S and 56 grams (1.17 moles) of CH₃SH. The other 3,277 grams were in the form of a liquid consisting of 2,209 grams of DMDS, 1,064 grams (22.2 moles) of CH₃SH, and 4 grams of ET₃N. Of the 2,209 grams of DMDS, 369 grams represented the amount originally introduced and the remainder, which were in the amount of 1,840 grams (19.6 moles), was the DMDS produced by the process. The percentage of loss of mercaptan with respect to the converted mercaptan was 3%, so that the yield of the process was 97%.

Example II

The same apparatus was used and the coil 13 served to raise the temperature at the lower end to 110° C., which is the boiling point of the DMDS. The lower three baffles served to distill the CH₃SH which was dissolved in the DMDS and which was, thus, directly re-cycled in the column. The fresh CH₃SH was introduced above the third plate of the tower and the upper end of the column operated under the same conditions. The balance of the reaction was as follows:

4,550 grams of products were introduced consisting of 3,000 grams (62.5 moles) of CH₃SH gas and 1,550 grams of the solution of polysulphide consisting of 571 grams of DMDS, 6 grams of ET₃N, and 973 grams (30.4 moles) of sulphur. 4,550 grams of products were obtained, of which 1,113 grams were gas consisting of 1,033 grams of H₂S (30.4 moles), and 80 grams of CH₃SH (1.7 moles). Also, 3,347 grams of liquid were obtained, of which 6 grams were ET₃N, and 3,431 grams were DMDS, consisting of the original 571 grams had been introduced and 2,860 grams (30.4 moles) which was produced by the process. The rate of molar conversion of CH₃SH into DMDS is 97.3%, since the losses of CH₃SH were 2.7%. The simple washing with water in the washer 16 made it possible to free the DMDS which was produced from the amine which it contained.

Example III 1 mole of sulphur (32 grams) was mixed with 2.4 moles of thiophenol (264.4 grams) and 1% by weight, i.e., 3 grams of triethylamine. The action was instantaneous and very vigorous. In a few minutes the release of H₂S had taken place. The recrystallization of the diphenyldisulphide which is obtained and the measurement of the hydrogen sulphide which is formed leads to a yield of 80% with respect to the sulphur.

Example IV

The operation set forth in Example III was repeated using n-tripropylamine instead of the triethylamine and the same results were obtained.

Example V 1 mole of sulphur and 0.01 mole of tributylamine were added to 2.1 moles of n-butylmercaptan. The mixture was heated under reflux for about one and a half hours, that is to say, until there was no longer any release of $H_2S$. From the measurement of the unconverted mercaptan, it is deduced that the yield of n-dibutyldisulphide was 69.5%.

Example VI

By causing 2.1 moles of n-hexylmercaptan to react with 1 mole of sulphur and 0.028 mole of triethylamine, as in Example V, n-dihexyldisulphide was obtained with a yield of 65%.

While it will be apparent that the illustrated embodiments of the invention herein disclosed are well calculated to adequately fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A method for producing a disulphide having two identical hydrocarbon radicals, each radical having one to seven carbon atoms selected from the group consisting of alkyl, phenyl and benzyl groups, by reacting a mercaptan having the same radical with sulphur, which consists in:
   (a) dissolving sulphur in a quantity of the same disulphide which is to be produced and to which has been added 0.04 to 5.0% of an amine having 1 to 7 carbon atoms selected from the group consisting of alkylamines and alkanolamines,
   (b) contacting the solution of sulphur in said amount of disulphide with the mercaptan at a temperature between 0° C. and the boiling point of the disulphide, and
   (c) removing from the resulting liquid the fraction of unreacted mercaptan and recovering the product which remains.

2. A process for producing a disulphide having two identical hydrocarbon radicals, each radical having one to seven carbon atoms selected from the group consisting of alkyl, phenyl and benzyl groups, by reacting a mercaptan having the same radical with sulphur, which consists in:
   (a) dissolving sulphur in a quantity of the same disulphide which is to be produced and to which has been added 0.04 to 5.0% of an amine having 1 to 7 carbon atoms selected from the group consisting of alkylamines and alkanolamines,
   (b) contacting the solution of sulphur in said disulphide with the mercaptan at a temperature between 0° C. and the boiling point of the disulphide,
   (c) removing from the resulting liquid the fraction of unreacted mercaptan and recovering the liquid which remains, and
   (d) washing said liquid to remove the said amine therefrom.

3. Process for producing a disulphide having two identical hydrocarbon radicals, each radical having one to seven carbon atoms selected from the group consisting of alkyl, phenyl and benzyl groups, by reacting a mercaptan having the same radical with sulphur, which consists in:
   (a) adding 0.5 to 5% of an amine having 1 to 7 carbon atoms in its molecule selected from the group consisting of alkylamines an alkanolamines to a quantity of the same disulphide which is to be produced,
   (b) dissolving in the said disulphide containing the amine a substantial portion of sulphur,
   (c) reacting the solution of sulphur in the said disulphide with the mercaptan at a temperature between 0° C. and the boiling point of the disulphide,
   (d) removing by vaporization the unreacted mercaptan from the solution and recovering the liquid which then remains, and
   (e) washing the liquid with water to remove the amine it contains.

4. Process for producing a disulphide having two identical hydrocarbon radicals, each radical having one to seven carbon atoms selected from the group consisting of alkyl, phenyl and benzyl groups, by reacting a mercaptan having the same radical with sulphur, which consists in:
   (a) adding 0.5 to 5% of an amine having one to seven carbon atoms in its molecule selected from the group consisting of alkylamines an alkanolamines to a quantity of the same disulphide which is to be produced,
   (b) dissolving in said disulphide containing the amine 1 to 2.5 times the amount of sulphur,
   (c) reacting the solution of sulphur thus obtained with approximately two moles of the mercaptan per atom of sulphur dissolved, at a temperature between 50° C. and the boiling point of the disulphide,
   (d) removing any unreacted mercaptan from the solution by vaporization and recovering the liquid which remains, and
   (e) washing the liquid with water to remove the amine it contains.

5. A process for producing a dialkyl disulphide, each alkyl radical of which has 1 to 6 carbon atoms, by reacting a mercaptan having the same alkyl radical with sulphur, which consists in:
   (a) adding 0.5 to 5% by weight of an alkyl amine, the alkyl radical of which has 1 to 6 carbon atoms, to a quantity of the same disulphide which is to be produced,
   (b) dissolving in the said disulphide containing the amine 1 to 2.5 times the amount of sulphur,
   (c) reacting the solution thus obtained with approximately 2 moles of the mercaptan per mole of sulphur dissolved at a temperature between 50° C. and the boiling point of the disulphide,
   (d) removing unreacted mercaptan from the solution by vaporization and recovering the liquid which then remains, and
   (e) washing the liquid with water to remove any remaining amine.

6. A process in accordance with claim 5, wherein the solution of sulphur is passed in counterflow with the mercaptan, which is in the gaseous state, at a temperature which lies between 50° C. and the boiling point of the disulphide.

7. A process for preparing dimethyl disulphide by reacting methyl-mercaptan with sulphur which consists in adding 0.5 to 5% of trimethyl amine to dimethyldisulphide, dissolving 150 to 250 parts by weight of sulphur in 100 parts by weight of the amine containing dimethyldisulphide, continuously contacting in counterflow the solution thus obtained with a stream of gaseous methylmercaptan at a temperature in the range from 50° to 100° C. in an amount of about 2 moles of methyl-mercaptan per mole of sulphur dissolved, distilling the methyl-mercaptan remaining in the liquid thus obtained, and then washing the liquid with water to remove the amine.

8. A process for the preparation of an organic disulphide having alkyl or aryl radicals containing 1 to 7 carbon atoms, comprising the steps of
   (a) preparing a solution of elementary sulphur in a liquid selected from the class consisting of alkyl disulphide, aryl disulphide, and arylalkyl disulphide, containing 1 to 7 carbon atoms, (b) adding to the solution 0.5 to 5.0% of a substance selected from the class consisting of alkyl amines whose alkyl radical has 1 to 6 carbon atoms, (c) causing the solution thus formed to flow downwardly through a vertical reaction tower, (d) introducing at the lower end of the tower a quantity in vaporized form of mercaptan selected from the class consisting of methyl, ethyl, n-propyl, isopropyl, n-butyl, isobutyl, amyl, hexyl, and benzyl mercaptans, (e) permitting the mercaptan vapor to flow upwardly in continuous contact with the downwardly-flowing solution at a temperature between 50° C. and the boiling point of the disulphide, (f) collecting the desired product at the lower end of the tower, (g) collecting at the upper end of the tower $H_2S$ with a quantity of the mercaptan, and (h) separating mercaptan from the $H_2S$ for re-cycling through the tower.

9. A process as set forth in claim 8, wherein the product collected at the bottom of the tower is washed in water to remove any amine remaining therein.

10. A process as set forth in claim 9, wherein the product collected at the bottom of the tower is heated in the said bottom to drive off any mercaptan that may reside in the product.

No references cited.

CHARLES B. PARKER, *Primary Examiner.*

D. R. PHILLIPS, *Assistant Examiner.*